(12) United States Patent
Laurin et al.

(10) Patent No.: US 7,686,560 B2
(45) Date of Patent: Mar. 30, 2010

(54) RACK, CONVEYOR AND SHUTTLE AUTOMATED PICK SYSTEM

(75) Inventors: Larry Hermas Laurin, Bright (CA);
Gavin Leigh Sargeant, Bright (CA);
Fred James Kuper, Moorefield (CA);
George Richard Pipes, Salt Lake City, UT (US); Sergay Douglas Liston, Salt Lake City, UT (US)

(73) Assignee: Conestoga Cold Storage, Kitchener, Ontario (CA)

( * ) Notice: Subject to any disclaimer, the term of this patent is extended or adjusted under 35 U.S.C. 154(b) by 120 days.

(21) Appl. No.: 11/296,215

(22) Filed: Dec. 8, 2005

(65) Prior Publication Data

US 2007/0134077 A1   Jun. 14, 2007

(51) Int. Cl.
*B65G 1/04* (2006.01)

(52) U.S. Cl. .................. 414/278; 414/280; 414/807; 198/469.1

(58) Field of Classification Search .................. 414/278, 414/280, 285, 331.17, 259, 277, 807; 198/468.9, 198/469.1
See application file for complete search history.

(56) References Cited

U.S. PATENT DOCUMENTS

| | | | | |
|---|---|---|---|---|
| 3,750,804 A * | 8/1973 | Lemelson | ................ | 414/276 |
| 3,809,259 A * | 5/1974 | Pipes | ................ | 414/280 |
| 3,883,008 A * | 5/1975 | Castaldi | ................ | 414/270 |
| 4,273,234 A * | 6/1981 | Bourgeois | ................ | 198/347.3 |
| 4,389,157 A * | 6/1983 | Bernard et al. | ................ | 414/787 |
| 4,439,091 A * | 3/1984 | Frias | ................ | 414/22.59 |
| 4,453,874 A * | 6/1984 | Veldhuizen et al. | ...... | 414/797.3 |
| 4,690,602 A * | 9/1987 | Castaldi et al. | ................ | 414/282 |
| 4,830,178 A | 5/1989 | de Vries | | |
| 4,872,800 A | 10/1989 | Gutov | | |
| 5,056,978 A | 10/1991 | Grafe et al. | | |
| 5,238,100 A * | 8/1993 | Rose et al. | ................ | 198/468.6 |
| 5,238,350 A * | 8/1993 | Krieg et al. | ................ | 414/278 |
| 5,324,157 A * | 6/1994 | Stolzer | ................ | 414/281 |
| 5,615,992 A * | 4/1997 | Proske et al. | ................ | 414/807 |
| 5,810,540 A * | 9/1998 | Castaldi | ................ | 414/280 |
| 6,042,321 A | 3/2000 | Labell | | |
| 6,158,566 A * | 12/2000 | Pollock | ................ | 198/347.3 |
| 6,702,541 B1 * | 3/2004 | Lee | ................ | 414/253 |
| 7,344,348 B2 * | 3/2008 | Freudelsperger | ................ | 414/278 |
| 2005/0063801 A1 | 3/2005 | Durand | | |
| 2005/0074315 A1* | 4/2005 | Freudelsperger | ................ | 414/278 |
| 2005/0105992 A1* | 5/2005 | An et al. | ................ | 414/280 |

FOREIGN PATENT DOCUMENTS

EP   866 002 A2 *   9/1998
JP   59-207304 A *  11/1984

* cited by examiner

*Primary Examiner*—James Keenan
(74) *Attorney, Agent, or Firm*—Pillsbury Winthrop Shaw Pittman LLP (57) ABSTRACT

A rack and conveyor shuttle system for placing and retrieving articles of various sizes including a rack system having a shelving framework of at least two tubes spaced apart from one another at a distance, wherein the distance between the tubes is sufficient to support the article in a single stack and a motorized, conveyor shuttle system having at least two finger-like conveyors spaced apart from one another at a distance, wherein the distance between the finger-like conveyors is sufficient to move in between the two tubes so as to engage the article wherein the conveyor shuttle system is adapted to interlace in between the rack system for both placing and retrieving the article.

32 Claims, 10 Drawing Sheets

RACK, CONVEYOR AND SHUTTLE AUTOMATED PICK SYSTEM

FIELD OF THE INVENTION

This invention relates in general to an automated handling system and more particularly to a rack and conveyor shuttle system having a rack system adapted to retain different sized boxes of varying weight, and a conveyor shuttle system having at least two finger-like conveyors that move in between the rack system to pick and extract the various boxes.

BACKGROUND OF THE INVENTION

Material handling systems allow for various orders to be filled in warehouse environments. Depending on the warehouse and the type of goods being stored, material handling can be automated, semi-automated or manual. In general warehouses often contain a large number and a wide variety of goods which makes handling and storing these goods problematic. Typically material handling systems have attempted to track, store, and retrieve goods for customer orders in an efficient manner. Where a customer order contains various goods of different sizes and weights, the order has traditionally been filled by utilizing a multi-level rack system and manually going to each level and retrieving the specific goods. Depending on the warehouse and the goods being stored, sophisticated machinery is needed to reach the various levels of the rack system. Furthermore additional personnel are needed to not only operate the machinery but to manually retrieve the specific goods to fill the customer order.

Prior art handling systems have been devised to address the some of these noted problems. For example, U.S. Pat. No. 6,042,321 issued on Mar. 28, 2000 to Labell and relates to an automated storage system for receiving, storing and returning dairy cases stored without pallets. Specifically, the automated storage system comprises an article transporter which includes a shuttle that deposits and retrieves dairy cases stored in storage lanes of a storage rack and a rail system for supporting the shuttle and dairy cases stored thereon. One or more shuttles may be used in the automated storage and retrieval system and are coupled via a shuttle bridge. The rail system includes two or more outer support rails and two or more inner support rails for supporting the shuttle and dairy cases.

U.S. Pat. No. 4,872,800 which issued on Oct. 10, 1989 to Gutov relates to a unit goods storage includes racks, a framework of which is made up each of vertical masts giving support to stacks of cantilever shelves facing each other with their free sides so as to form vertical passages each containing a horizontal conveyor the ends of the frames of which extend beyond the framework. All ends of the frames of the conveyors are interlinked by stiff members so as to form therewith a grid work capable of displacing up and down the height of the storage under the action of a drive.

U.S. Pat. No. 5,056,978 which issued on Oct. 15, 1991 to Grafe et al. relates to a high shelf system and a conveyor arrangement including a vertical mast structure which is movable in longitudinal direction of a corridor between shelf racks. The mast structure includes load receiving members which can be aligned with the shelf compartments. The load receiving members are displaceable perpendicularly to the shelf corridor. A load receiving member is fixedly arranged on the mast structure for each shelf level. At least one loading and unloading station is provided for the conveyor arrangement for vertically moving units to be stored between a storage input and output level and the shelf compartments. Each load receiving member carries on a rigid platform a transverse conveyor device which is adjustable along the entire length of the platform and beyond each end of the platform. The transverse conveyor device includes a slide or carriage. A linear drive arranged on the platform acts on the slide. The slide has at both ends thereof locking members for the units to be stored. The locking members can be raised and lowered transversely of the direction of movement of the slide. The locking members are coupled to an adjusting drive which is mounted on the slide or to an adjusting drive which is mounted partially on the slide and partially on the platform.

Thus a rack and conveyor shuttle system which allows for efficiently and accurately filling of mixed pallet orders that have different sized and weighted boxes would be is desirable.

SUMMARY OF THE INVENTION

An object of one aspect of the present invention is to provide an improved rack and conveyor shuttle system for placing and retrieving articles of various sizes.

In accordance with one aspect of the present invention there is provided a rack and conveyor shuttle system for placing and retrieving articles of various sizes including a rack system having a shelving framework of at least two tubes spaced apart from one another at a distance, wherein the distance between the tubes is sufficient to support the article in a single stack and a motorized, conveyor shuttle system having at least two finger-like conveyors spaced apart from one another at a distance, wherein the distance between the finger-like conveyors is sufficient to move in between the two tubes so as to engage the article wherein the conveyor shuttle system is adapted to interlace in between the rack system for both placing and retrieving the article.

Conveniently, each finger-like conveyer further includes a conveyor belt and a series of grooved pulleys where the grooved pulleys drive the conveyor belt and grab the article.

Preferably, a controller is adapted to control the movement of the conveyor shuttle system and more specifically move the finger-like conveyors from side to side. Furthermore the motorized conveyor shuttle system may have two independent motors wherein the first motor powers the movement of conveyor belt and the series of grooved pulleys and the second motor powers the movement of the finger-like conveyor's movement from side to side.

Advantages of the present invention are the ability to place and retrieve different sized boxes and different weighted boxes, all placing and retrieving is automated so that manual labour is not required to be in a cold environment, placing and retrieving has increased accuracy and efficiency, reduced costs as manual labour is avoided, mixed orders of various articles in various sizes can be created and filled, and system can be implemented on a large scale such as a multi-level freezer.

BRIEF DESCRIPTION OF THE DRAWINGS

A detailed description of the preferred embodiment is provided herein below by way of example only and with reference to the following drawings, in which.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 1:
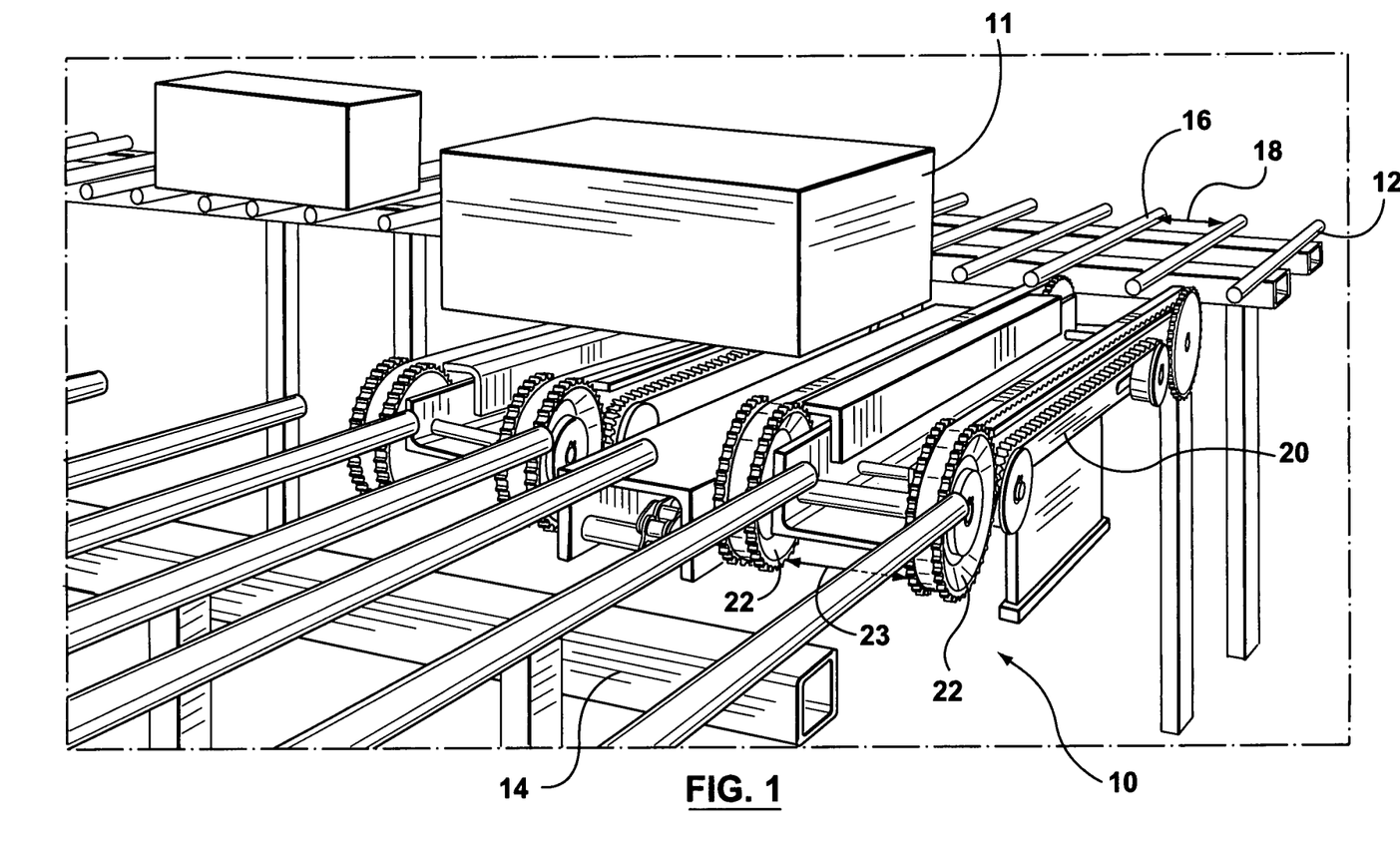
FIG. 1 in a perspective view, illustrates a rack and conveyor shuttle system in accordance with the preferred embodiment of the present invention.

Referring to FIG. 1, there is illustrated in a perspective view, a rack and conveyor shuttle system for placing and retrieving articles of various sizes in accordance with the preferred embodiment of the present invention. The rack and conveyor shuttle system 10 for placing and retrieving articles 11 of various sizes includes a rack system 12 having a shelving framework 14 of at least two tubes 16 spaced apart from one another at a distance 18. The distance 18 between the tubes 16 must be sufficient to support the article 11 in a single stack. The rack and conveyor shuttle system 10 further includes a motorized, conveyor shuttle system 20 having at least two finger-like conveyors 22 spaced apart from one another at a distance 23. The distance 23 between the finger-like conveyors 22 must be sufficient to move in between the tubes 16 so as to engage the article 11. The conveyor shuttle system 20 is adapted to interlace in between the rack system 12 for both placing and retrieving the article 11. The article 11 may be a box, by way of example having a weight range of 100 grams to 150 pounds. The box may also have a size range of 10 by 10 by 1 inch to 30 by 25 by 30 inches.

Figure 2:
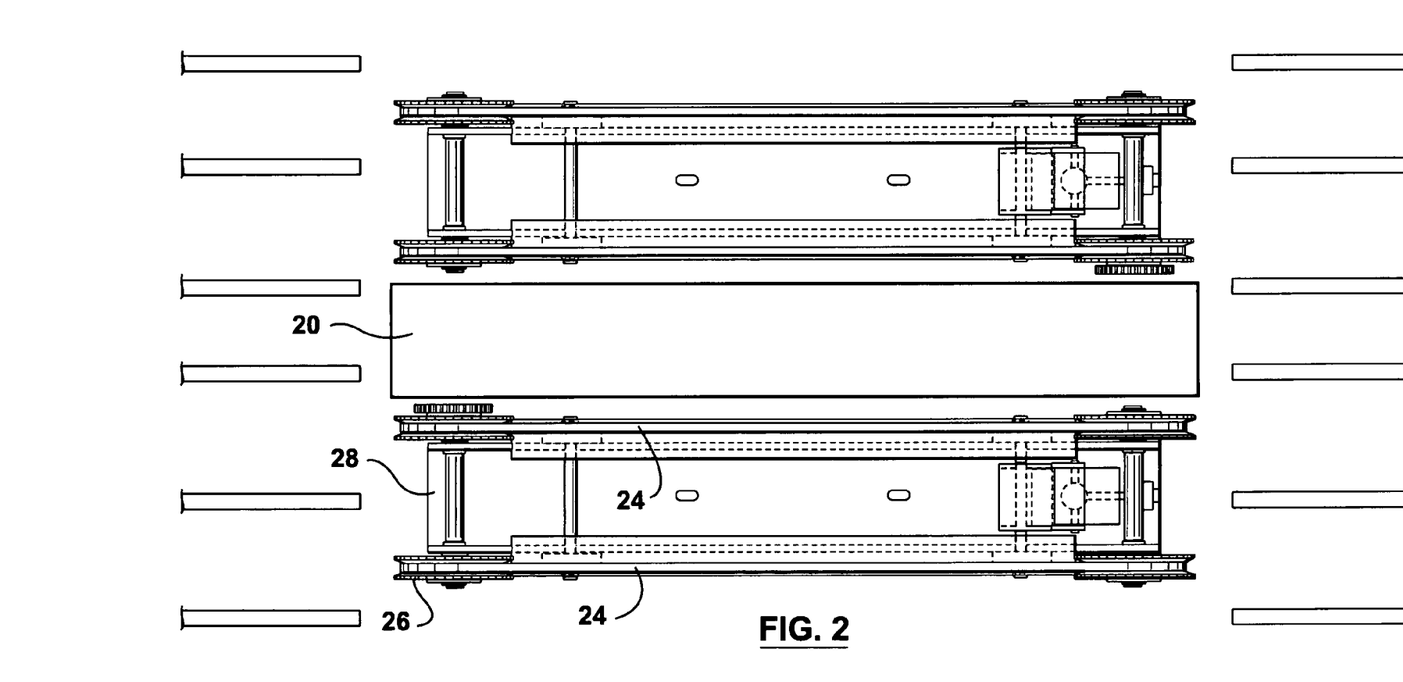
FIG. 2 in a top plan view, illustrates the conveyor shuttle system of FIG. 1.
Figure 3:
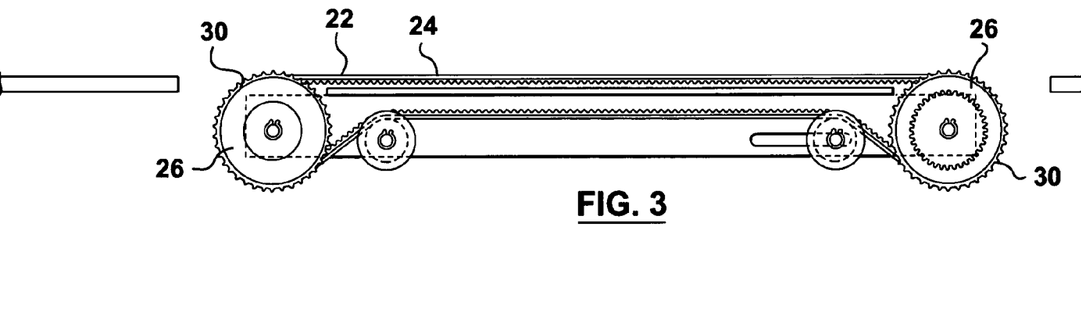
FIG. 3 in a side elevation view illustrates the conveyor shuttle system of FIG. 1.

Referring to FIGS. 2 and 3 each finger-like conveyer 22 is further defined as having a conveyor belt 24 and a series of grooved pulleys 26. More specifically the conveyor belt 24 of each finger-like conveyor belt 22 is used to carry the article 11. Typically any article 11 being moved requires at least two conveyor belts 24 to carry the article 11. The grooved pulleys 26 not only drive the conveyor belt 24 but they also grab the article 11. Specifically the grooved pulleys 26 are positioned at the leading edge 28 of the conveyor shuttle system 20. The conveyor belt 24 is positioned around the series of pulleys 26 so that the pulleys 26 drive the conveyor belt 24 when the conveyor shuttle system 20 is activated. The positioning of the grooved pulleys 26 at the leading edge 28 of the conveyor shuttle system 20 furthermore allows the grooved pulleys 26 to grab the article 11 when the conveyor shuttle system 20 is either placing or retrieving the article 11. More specifically the grooved pulleys 26 may be defined as having teeth 30 that bite into the article 11 for example a box so that the article 11 is grabbed by the teeth 30 and moved onto the conveyor belt 24 without slipping.

Figure 4:
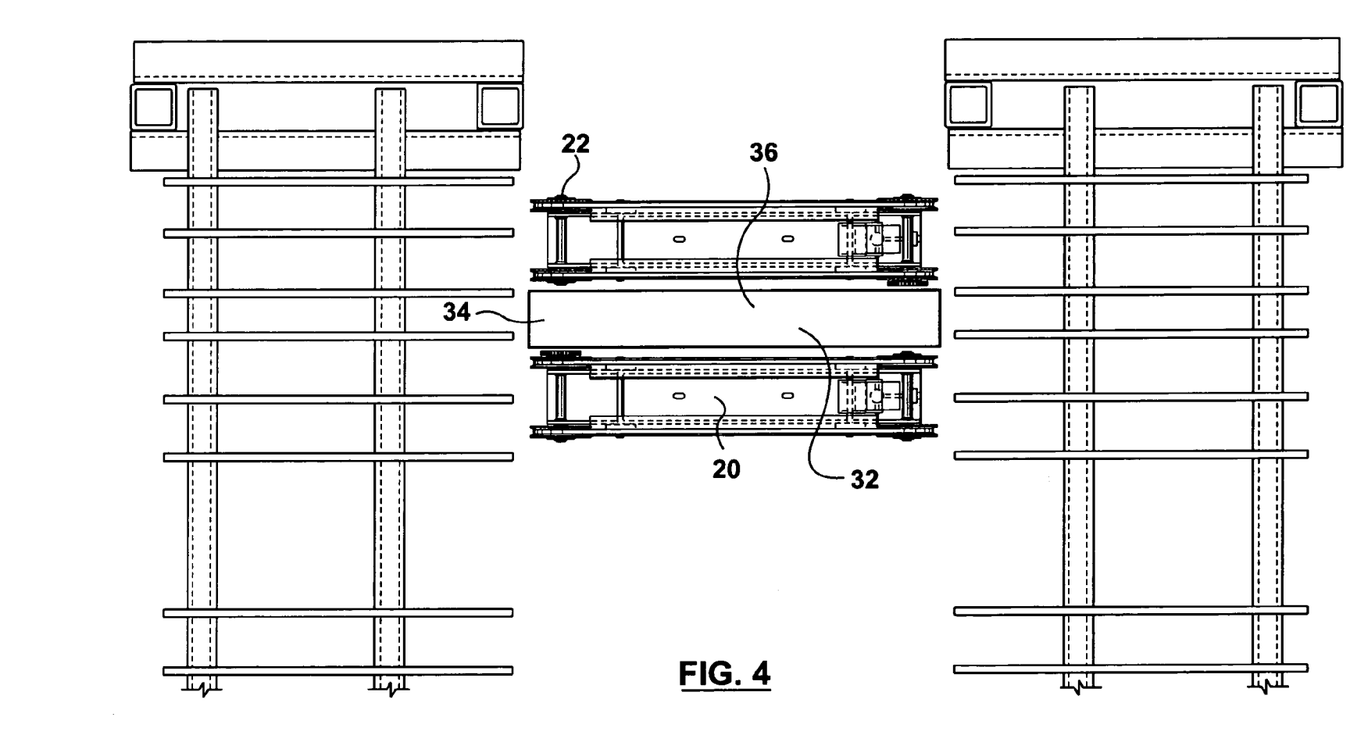
FIG. 4 in a top plan view illustrates the conveyor shuttle system and the rack system of FIG. 1.
Figure 5:
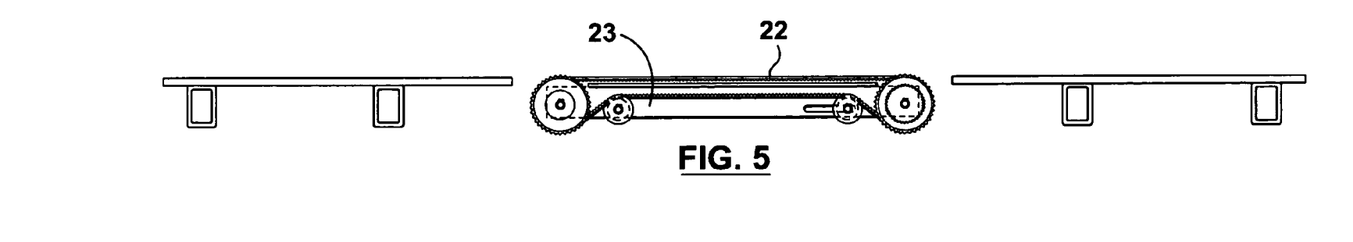
FIG. 5 in a side elevation view illustrates the conveyor shuttle system and the rack system of FIG. 1.

Referring to FIGS. 4 and 5 the conveyor shuttle system 20 further includes a controller 32 adapted to control the movement of the conveyor shuttle system 20. Specifically the controller 32 may be further defined as a programmable logic controller 34 that coordinates a variety of elements outlined below including the movement of the conveyor shuttle system 20. Generally the controller 32 moves the finger-like conveyors 22 from side to side and more specifically controls the movement in directions such as place right, retrieve right, place left or retrieve left.

Figure 6A:
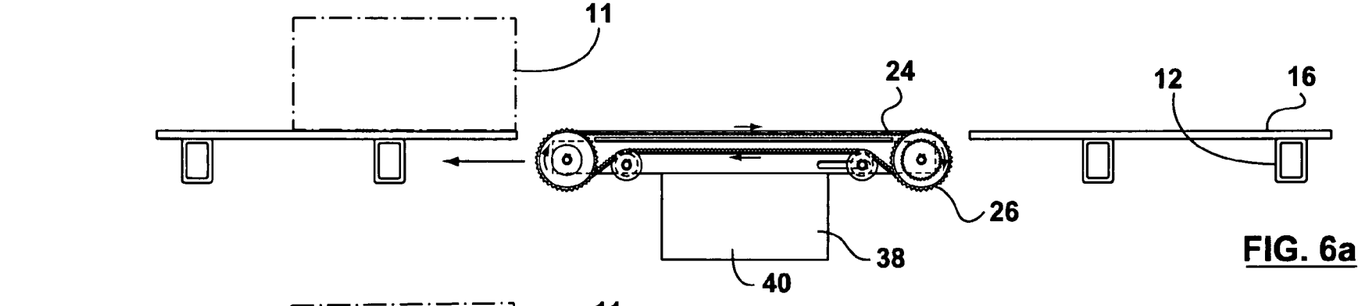
FIG. 6a in a side elevation view illustrates the conveyor shuttle system and its interaction with the rack system of FIG. 1.
Figure 6B:
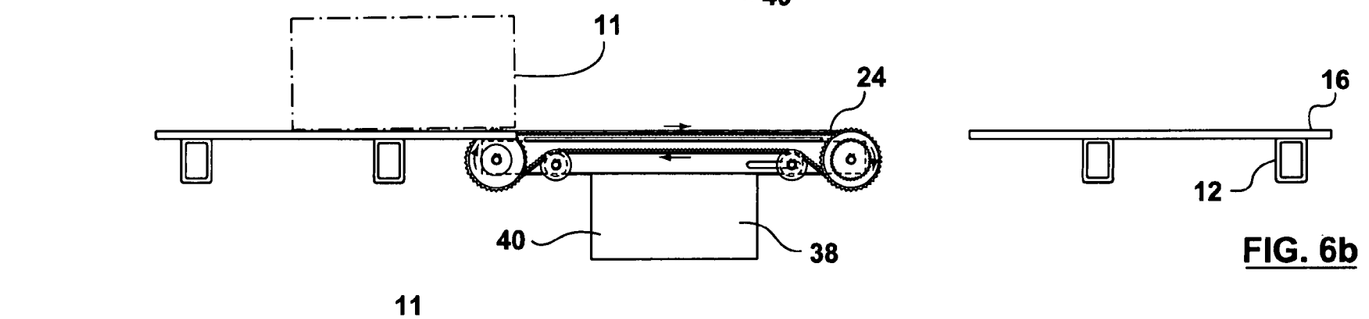
FIG. 6b in a side elevation view illustrates the conveyor shuttle system and its interaction with the rack system of FIG. 1.
Figure 6C:
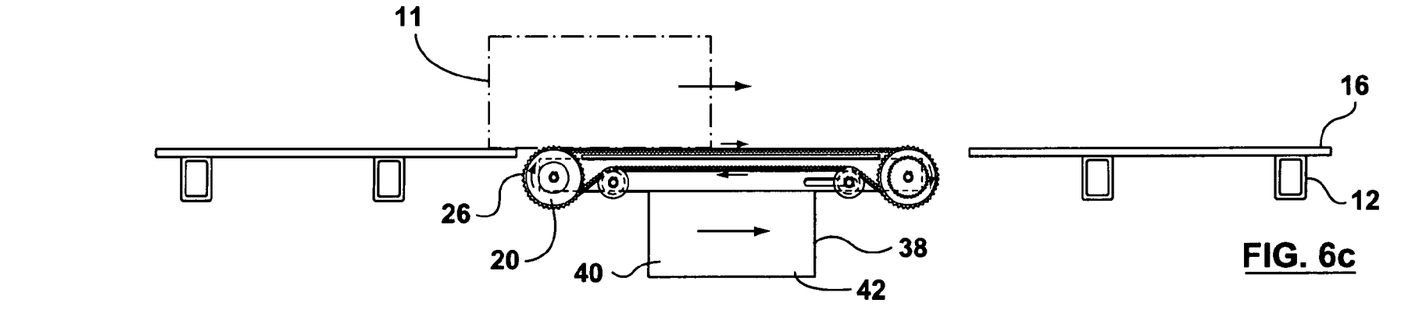
FIG. 6c in a side elevation view illustrates the conveyor shuttle system and its interaction with the rack system of FIG. 1.

Referring to FIGS. 6a-c the controller 32 along with a computer management system 36 coordinates the movement of the motorized conveyor shuttle system 20. Specifically the motorized conveyor shuttle system 20 includes two independent motors 38 and 40 respectively. The first motor 38 powers the movement of the conveyor belt 24 and the series of grooved pulleys 26 and the second motor 40 powers the movement of the finger-like conveyor's 22 movement from side to side to place and retrieve the article 11. Furthermore the controller 32 and the computer management system 36 coordinate the speed of the conveyor belt 24 and the movement of the conveyor shuttle system 20 so as to accurately position the article 11 on the rack system 12. Specifically when the conveyor shuttle system 20 is placing the article 11, the conveyor belts 24 must move or shift in a direction to place the article 11 on the tubes 16. The conveyor belts 24 must stop at the correct position to ensure the article 11 is securely and correctly placed on the tubes 16. Once the article 11 is positioned correctly, the conveyor belts 24 must move or shift in sequence to allow the article 11 to remain in exactly the same position on the tubes 16 while the conveyor shuttle system 20 retracts.

When retrieving the article 11 the conveyor belts 24 move of shift in a side sequence so that the series of grooved pulleys 26 walk under the article 11 and grab the article 11. This movement ensures that the conveyor shuttle system 20 does not push the article further onto the tubes 16. Once the conveyor belts 24 have engaged the article 11, the conveyor belts 24 reverse their direction and bring the article 11 as the same time as the conveyor shuttle system 20 retracts.

Figure 7:
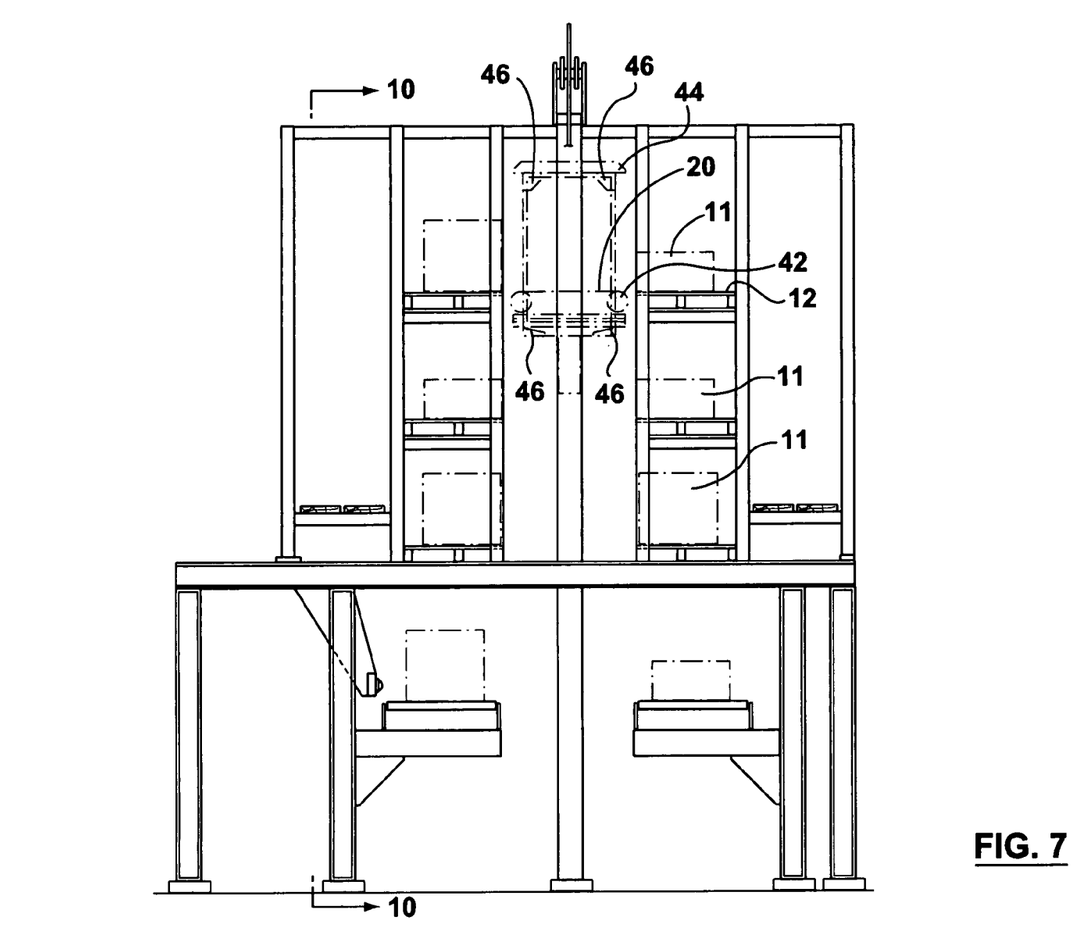
FIG. 7 in a side elevation view illustrates the conveyor shuttle system within the rack system of FIG. 1.

Referring to FIG. 7 the conveyor shuttle system 20 further includes a linear transducer 42 that interacts with the controller 32 and the computer management system 36 for indicating the positioning of the finger-like conveyors 22 relative to the rack system 12. More specifically the linear transducer 42 communicates with the computer management system 36 the exact location of the conveyor shuttle system 20 and its related movement. This allows for the conveyor shuttle system 20 to be positioned or interlaced accurately into the rack system 12 at the correct distance when the conveyor shuttle system 20 is retrieving or placing an article from the rack system 12, and also communicates to the computer management system 36 when the conveyor shuttle system 20 has retracted from the rack system 12.

The conveyor shuttle system 20 further includes a positioning system 44 that aids in correctly positioning the article 11 of the rack system 12 during its placing and retrieving. More specifically the positioning system 44 is a series of photo eyes 46 positioned above and below the finger-like conveyors 22. The photo eyes 46 interact and identify to the controller 32 and the computer management system 36 when the article 11 has cleared the rack system 12 or the conveyor shuttle system 20. The photo eyes 46 therefore provide the exact status and or location of the article 11 and the conveyor shuttle system 20 at all times.

Figure 8:
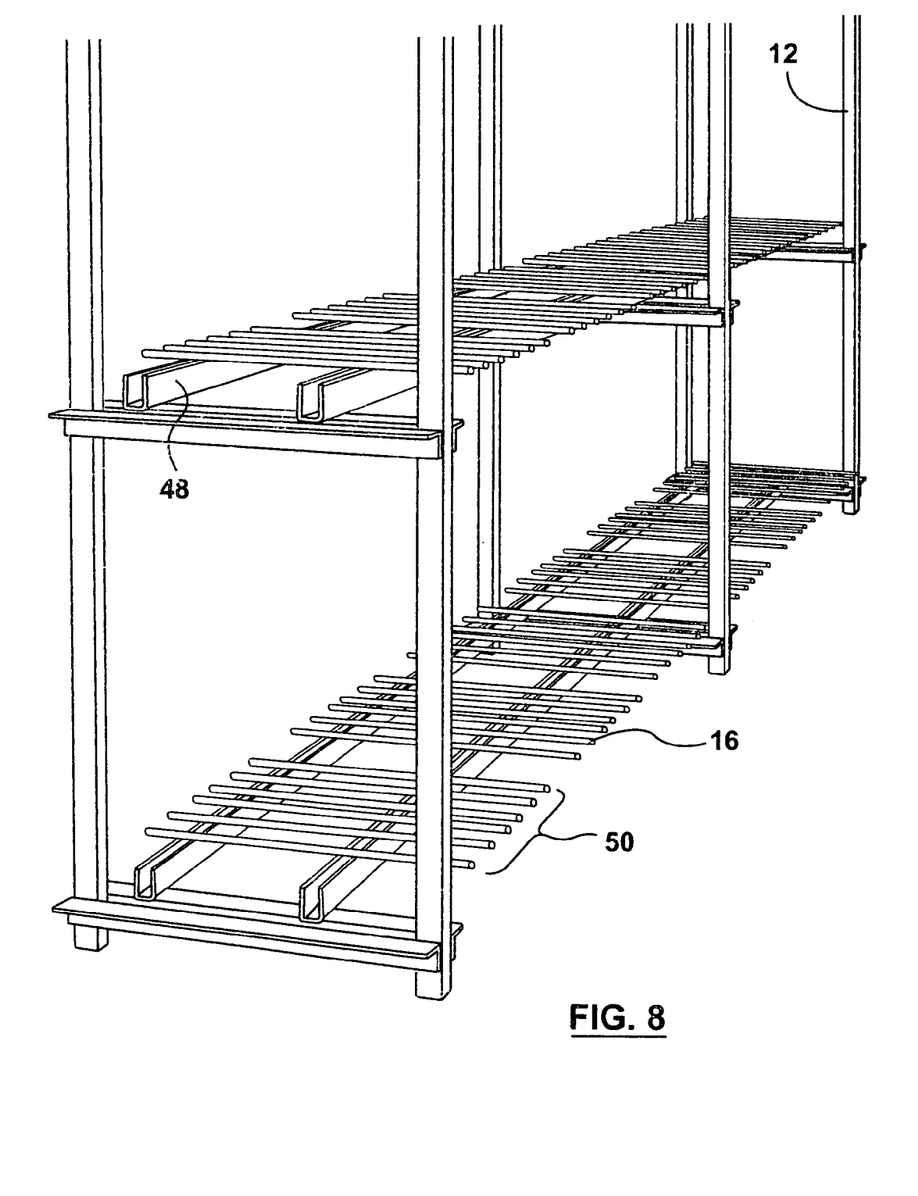
FIG. 8 in a perspective view illustrates the rack system of FIG. 1.
Figure 9A:
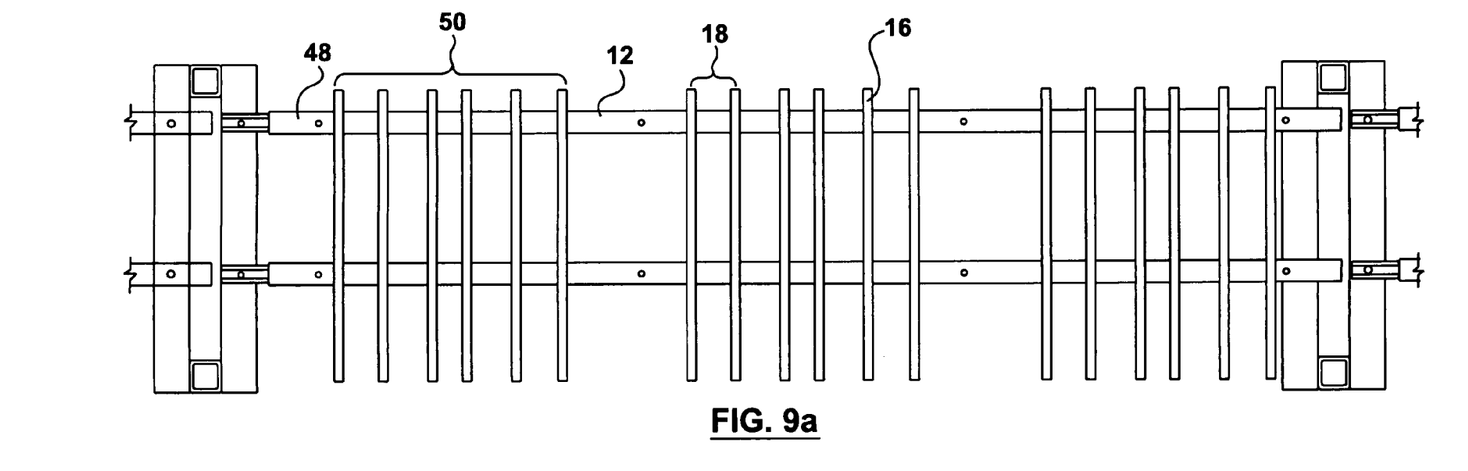
FIG. 9a in a top plan view illustrates the rack system of FIG. 1.
Figure 9B:
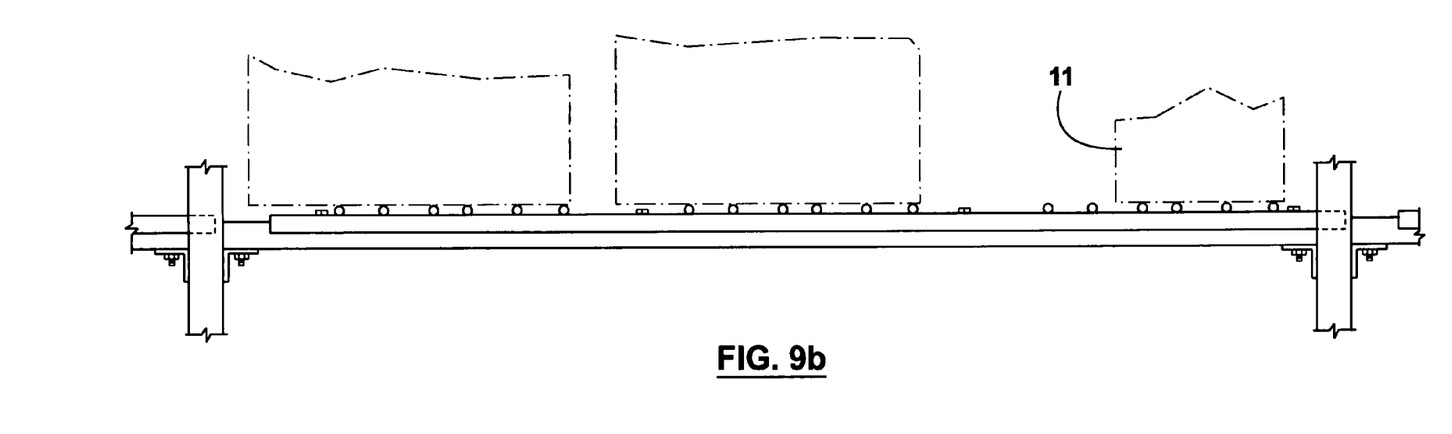
FIG. 9b in a side elevation view illustrates the rack system of FIG. 1.
Figure 10:
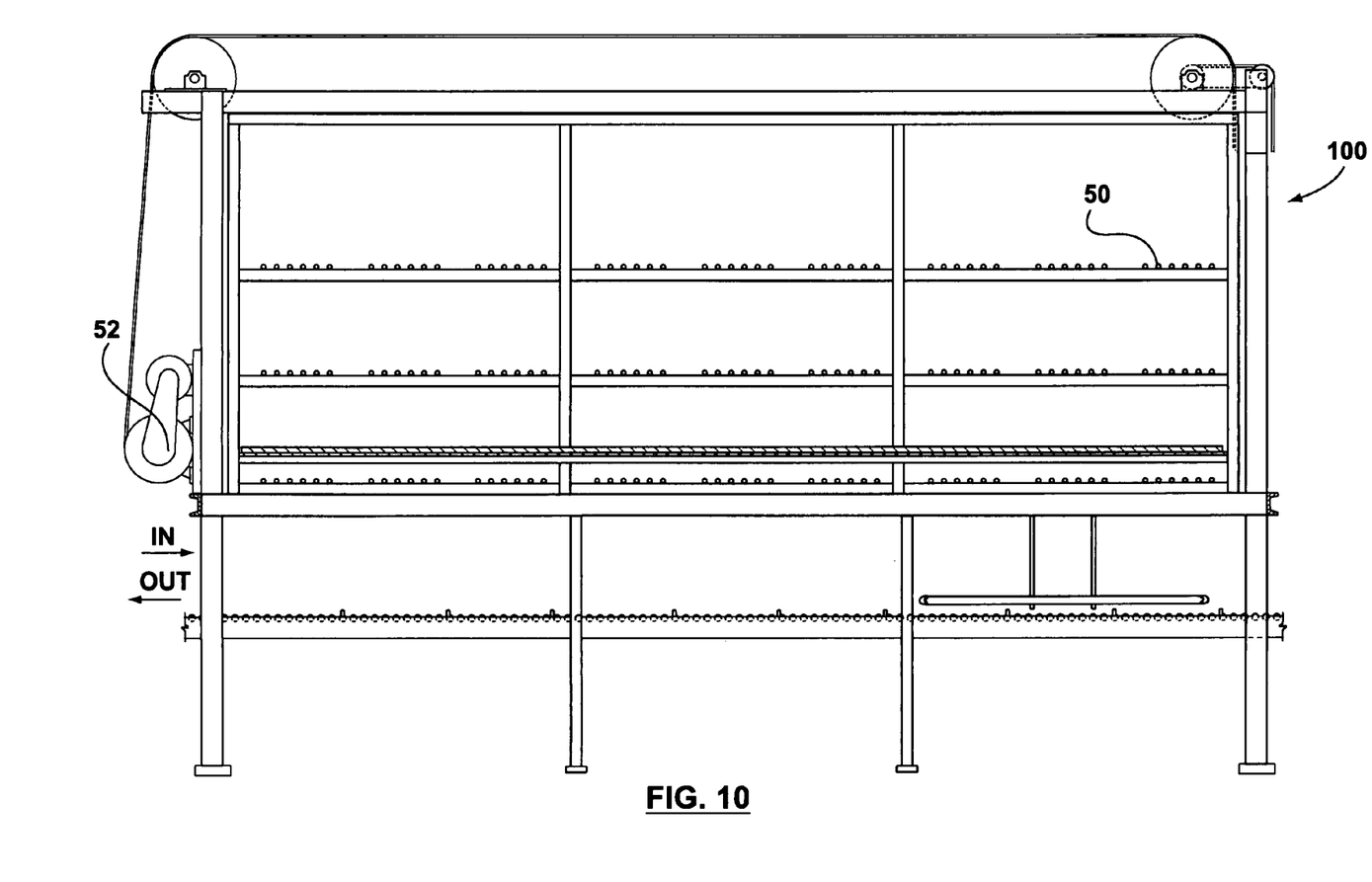
FIG. 10 in a front plan view illustrates the rack system of FIG. 1.

Referring to FIGS. 8 and 9 the rack system 12 may be further defined where the shelving framework 14 is ¾ inch tubing 16 positioned perpendicular to cross-members 48. The article 11 is supported by a minimum of two tubes 16, the tubes 16 therefore acting as a shelf. In general the shelving framework 14 is a series of rack sections 50 wherein one rack section 50 accommodates one article 11. Typically four tubes make up one rack section 50 to support one article 11. The tubes 16 are spaced apart from one another at sufficient distance 18 to ensure that the size of article 11 is completely supported by the rack section 50 and therefore the article 11 will not slip through the distance 18 between the tubes 16. The distance 18 between the tubes 16 is also important to allow for the finger-like conveyors 22 to interlace or go between the tubes 16 without interfering with the tubes 16 therefore allowing the finger-like conveyors 22 to pick up or grab the article 11 in an accurate manner. The rack sections 50 are organized to allow for the single stacking of the articles 11. Therefore each rack section 50 supports a single article 11 on one level, with no double stacking of the article 11.

Referring to FIGS. 10-13c the rack and conveyor shuttle system 10 for placing and retrieving articles of various sizes may be implemented on a large scale in a large modular system 100. Specifically the rack and conveyor shuttle system 10 may be implemented in a multi-level freezer or cold-storage building. Specifically the motorized, conveyor shuttle system 20 can include nine groups of four finger-like conveyors 22 mounted on a movable member 52. The movable member 52 may be further defined as a load beam that is positioned adjacent the rack system 12. The movable member 52 therefore allows the groups of finger-like conveyors 22 to interlace with the rack system 12. The movable member 52 or load beam moves in a vertical direction up and down the height of the large modular system 100. More specifically the modular system 100 may be up to thirty-five levels high therefore allowing for up to thirty-five levels of shelving framework 14. Depending on the size of the modular system 100 there may be over twenty movable members 52 each with nine groups of four finger-like conveyors 22 servicing over thirteen thousand individual rack sections 50.

Figure 11:
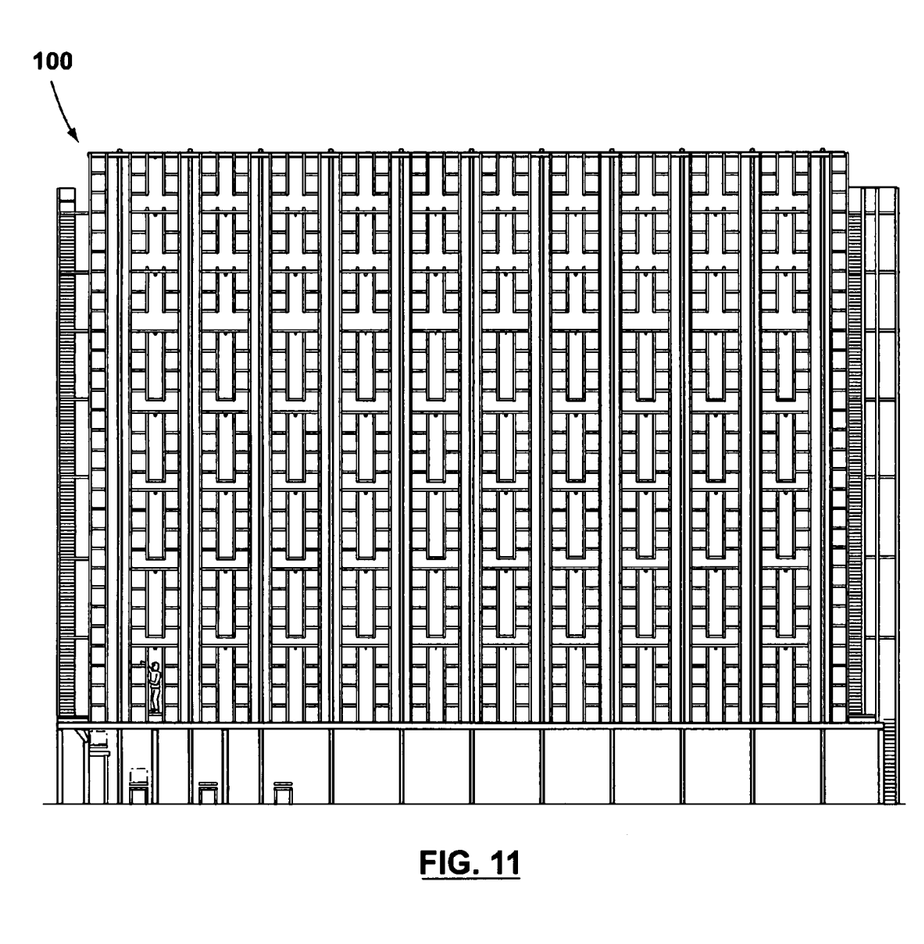
FIG. 11 in a front plan view illustrates the large modular system.
Figure 12:
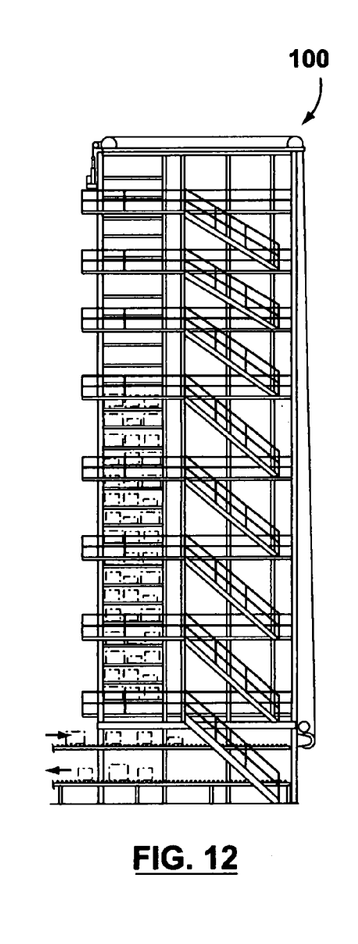
FIG. 12 in a side elevation view illustrates the large modular system.
Figure 13A:
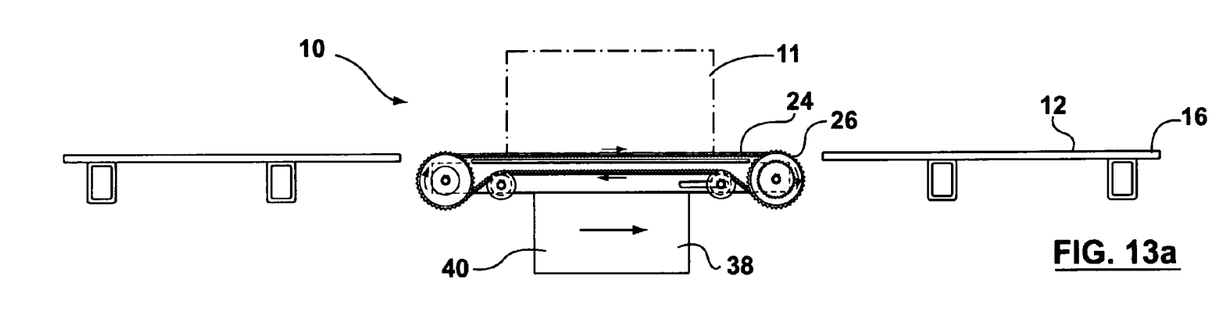
FIG. 13a in a side elevation view illustrates the conveyor shuttle system interacting with the rack system of FIG. 1.
Figure 13B:
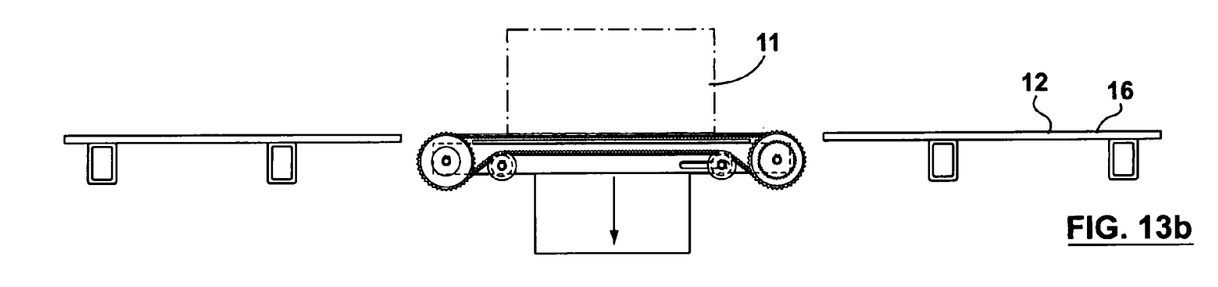
FIG. 13b in a side elevation view illustrates the conveyor shuttle system interacting with the rack system of FIG. 1.
Figure 13C:
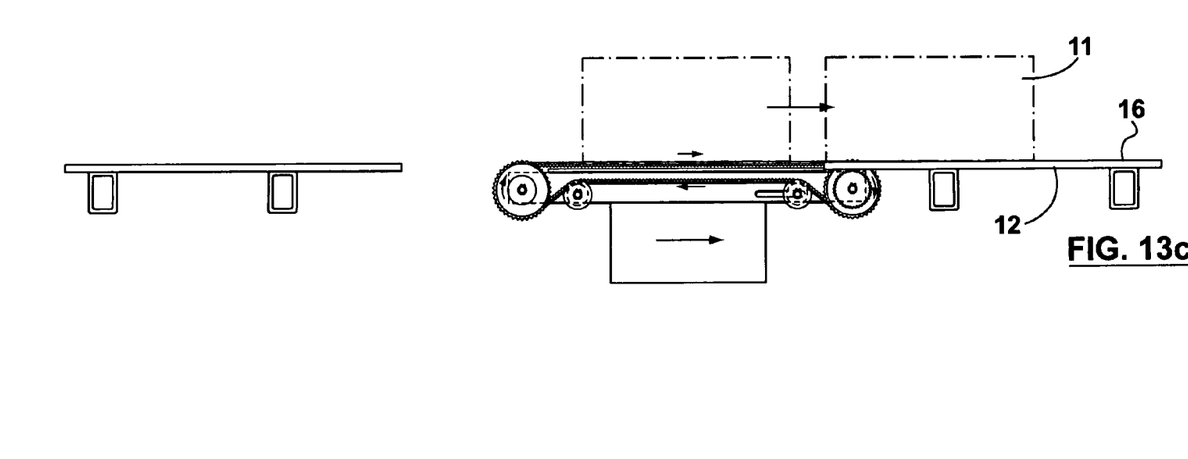
FIG. 13c in a side elevation view illustrates the conveyor shuttle system interacting with the rack system of FIG. 1.

In operation, the rack and conveyor shuttle system 10 is incorporated into a large modular system 100. Typically full pallets of articles 11 or boxes are presented to a de-palletiser. The required amount of articles 11 are removed and placed on a section of an input conveyor. The input conveyor subsequently distributes the articles 11 to the motorized conveyor shuttle system 20. Through a coordinated computer system the movable member 52 moves up and down the large modular system 100 storing the articles 11 in pre-determined rack sections 50. Upon an order request, the movable member 52 moves to the appropriate level of the large modular system 100 and the conveyor shuttle system 20 is activated via the controller 32 and retrieves or picks the desired article 11. Once the order is complete with a variety of different sized articles 11, the movable member 52 returns to the ground level, where the articles 11 are unloaded by an output conveyor.

The conveyor shuttle system 20 will place and retrieve articles throughout the modular system 100, making up multi product orders, and presenting them to the output conveyor section which takes the product to a pallet, where it is handled by an operator. The placing and retrieving operation may occur simultaneously allowing for a cost effective and efficient system Other variations and modifications of the invention are possible. All such modifications or variations are believed to be within the sphere and scope of the invention as defined by the claims appended hereto.

We claim:

1. A rack and conveyor shuttle system for placing and retrieving articles of various sizes comprising:
   (a) a constantly stationary multi-level rack system having a constantly stationary, substantially horizontal shelving framework of at least two support members spaced apart from one another at a distance, wherein the distance between the at least two support members is sufficient to support the articles in a single stack, said shelving framework comprised of at least two rack sections; and
   (b) a motorized, conveyor shuttle system having two narrow conveyors, each narrow conveyor having a narrow conveyor belt spanning a distance between two rack sections on either side of the conveyor, and a series of grooved pulleys wherein the grooved pulleys drive the conveyor belt and grab the articles and each narrow conveyor is spaced apart from one another at a distance, wherein:
      (i) in retrieving articles from the multi-level rack system, the conveyors are configured to move in between at least two support members of the constantly stationary shelving framework, in a substantially horizontal direction only, so as to engage an article and transfer the article from the at least two support members to the conveyor shuttle system without substantially changing the level of the article; and
      (ii) in placing articles onto the multi-level rack system, the conveyors are configured to move in between the at least two support members of the constantly stationary shelving framework, in a substantially horizontal direction only, so as to transfer an article from the conveyor shuttle system to the at least two support members without substantially changing the level of the article,
   such that the conveyors do not contact the at least two support members while transferring articles.

2. A rack and conveyor shuttle system as claimed in claim 1 wherein each grooved pulley is a toothed pulley.

3. A rack and conveyor shuttle system as claimed in claim 1 further comprising a controller adapted to control the movement of the conveyor shuttle system.

4. A rack and conveyor shuttle system as claimed in claim 3 wherein the controller moves the narrow conveyors from side to side.

5. A rack and conveyor shuttle system as claimed in claim 3 wherein the controller further comprises a computer management system.

6. A rack and conveyor shuttle system as claimed in claim 5 wherein the motorized conveyor shuttle system has two independent motors wherein the first motor powers the movement of the conveyor belt of each of the narrow conveyors and the series of grooved pulleys and the second motor powers the movement of the narrow conveyor's movement from side to side.

7. A rack and conveyor shuttle system as claimed in claim 5 wherein the controller and computer system coordinate the speed of the conveyor belt and the movement of the conveyor shuttle system to position the articles on the rack system.

8. A rack and conveyor shuttle system as claimed in claim 5 wherein the conveyor shuttle system further comprises a linear transducer for indicating the positioning of the narrow conveyors relative to the rack system.

9. A rack and conveyor shuttle system as claimed in claim 5 wherein the conveyor shuttle system further comprises a positioning system so as to correctly position the articles during placing and retrieving.

10. A rack and conveyor shuttle system as claimed in claim 9 wherein the positioning system is a series of photo eyes positioned above and below the narrow conveyors.

11. A rack and conveyor shuttle system as claimed in claim 1 wherein the narrow conveyors move in directions to place an article to the right, retrieve an article to the right, place an article to the left or retrieve an article to the left.

12. A rack and conveyor shuttle system as claimed in claim 1 wherein the articles comprise boxes having a weight range of 100 grams to 150 pounds.

13. A rack and conveyor shuttle system as claimed in claim 1 wherein the articles comprise boxes having a size range of 10 by 10 by 1 inch to 30 by 25 by 30 inches.

14. A rack and conveyor shuttle system as claimed in claim 1 wherein the shelving framework is ¾ inch tubing positioned perpendicular to cross-members wherein the articles are supported by a minimum of two tubes.

15. A rack and conveyor shuttle system as claimed in claim 1 wherein the shelving framework is a series of rack sections wherein one rack section accommodates one article.

16. A rack and conveyor shuttle system as claimed in claim 1 wherein four tubes support one article.

17. A rack and conveyor shuttle system as claimed in claim 1 wherein the rack system has up to thirty-five levels of shelving framework.

18. A rack and conveyor shuttle system as claimed in claim 1 wherein the motorized, conveyor shuttle system has nine groups of four narrow conveyors mounted on a movable member.

19. A rack and conveyor shuttle system as claimed in claim 18 wherein the movable member is positioned adjacent the rack system allowing the groups of narrow conveyors to interlace directly with the rack system and move between the levels of shelving framework.

20. A rack and conveyor shuttle system as claimed in claim 1, further comprising:
 a moveable member configured to move the conveyors in the vertical direction to another, different level of the multi-level rack system when the conveyors are not in between the support members.

21. A rack and conveyor shuttle system for placing and retrieving articles, comprising:
 (a) a stationary multi-level rack system having a stationary shelving framework of a plurality of support members spaced apart from one another, the plurality of support members configured to support articles; and
 (b) a conveyor shuttle system that is movable relative to the stationary multi-level rack system to retrieve and place articles to and from the rack system, the conveyor shuttle system including at least two elongated conveyors that are spaced apart from each other, each of the at least two elongated conveyors having two opposite ends and including a grooved pulley located at each of the two opposite ends and an elongated conveyor belt, each grooved pulley located at each of the two opposite ends being configured to drive said elongated conveyor belt and grab articles such that each grooved pulley is configured to place and retrieve articles to and from the rack system,
 wherein:
 (i) in retrieving articles from the multi-level rack system, the conveyors are configured to move in between at least two support members of the rack system, in a horizontal direction only, so as to engage an article and transfer the article from the at least two support members to the conveyor shuttle system without substantially changing the level of the article; and
 (ii) in placing articles onto the multi-level rack system, the conveyors are configured to move in between at least two support members of the rack system, in a horizontal direction only, so as to transfer an article from conveyor shuttle system to the at least two support members without substantially changing the level of the article,
 such that the conveyors do not contact the at least two support members while transferring articles.

22. The rack and conveyor shuttle system of claim 21, wherein both ends of the at least two elongated conveyors are configured to directly interlace in between at least two support members to place and retrieve articles to and from the rack system.

23. The rack and conveyor shuttle system of claim 21, wherein the conveyor shuttle system is configured such that, during retrieval and placement of articles to and from the rack system, a grooved pulley of one of the at least two elongated conveyors and a grooved pulley of the other one of the at least two elongated conveyors are positioned on opposite sides of one of the support members.

24. The rack and conveyor shuttle system of claim 21, wherein each grooved pulley is a toothed pulley.

25. The rack and conveyor shuttle system of claim 21, further comprising a controller adapted to control the movement of the conveyor shuttle system.

26. The rack and conveyor shuttle system of claim 25, wherein the controller is configured to coordinate the speed of the conveyor belt and the movement of the conveyor shuttle system to position the articles on the rack system.

27. A conveyor shuttle system configured to cooperate with a stationary multi-level rack system having a stationary shelving framework of a plurality of support members spaced apart from one another, the plurality of support members configured to support articles, the conveyor shuttle system being movable relative to the rack system to retrieve and place articles to and from the rack system, the conveyor shuttle system comprising:
 at least two elongated conveyors that are spaced apart from each other, each of the at least two elongated conveyors having two opposite ends and including a grooved pulley located at each of the two opposite ends and an elongated conveyor belt, each grooved pulley located at each of the two opposite ends being configured to drive said elongated conveyor belt and grab articles such that each grooved pulley is configured to place and retrieve articles to and from the rack system,
 wherein:
 (i) in retrieving articles from the multi-level rack system, the conveyors are configured to move in between at least two support members of the rack system, in a substantially horizontal direction only, so as to engage the bottom of an article and transfer the article from the at least two support members to the conveyor shuttle system without substantially changing the level of the article; and (ii) in placing articles onto the multi-level rack system, the conveyors are configured to move in between at least two support members of the rack system, in a substantially horizontal direction only, so as to engage the bottom on an article and transfer the article from conveyor shuttle system to the at least two support members without substantially changing the level of the article, such that the conveyors do not contact the at least two support members while transferring articles.

28. The conveyor shuttle system of claim 27, wherein both ends of the at least two elongated conveyors are configured to directly interlace in between at least two support members to place and retrieve articles to and from the rack system.

29. A rack and conveyor shuttle system for placing and retrieving articles of various sizes comprising:

(a) a constantly stationary multi-level rack system having a constantly stationary shelving framework of at least two support members spaced apart from one another at a distance, wherein the distance between at least two support members is sufficient to support the articles in a single stack; and (b) a motorized, conveyor shuttle system having at least two narrow conveyors each having a narrow conveyor belt and a series of grooved pulleys wherein the grooved pulleys drive the conveyor belt and grab the articles and each narrow conveyor is spaced apart from one another at a distance, wherein the distance between at least two narrow conveyors is sufficient to move in between at least two support members of the constantly stationary shelving framework so as to engage the articles in a horizontal direction only, wherein:

(i) in retrieving articles from the multi-level rack system, the conveyors are configured to move in between at least two support members of the rack system, in a substantially horizontal direction only, so as to engage the bottom of an article and transfer the article from the at least two support members to the conveyor shuttle system without substantially changing the level of the article; and (ii) in placing articles onto the multi-level rack system, the conveyors are configured to move in between at least two support members of the rack system, in a substantially horizontal direction only, so as to engage the bottom of an article and transfer the article from conveyor shuttle system to the at least two support members without substantially changing the level of the article, such that the conveyors do not contact the at least two support members while transferring articles.

30. A rack and conveyor shuttle system for placing and retrieving articles of various sizes comprising:

(a) a constantly stationary multi-level rack system having a constantly stationary, substantially horizontal shelving framework of at least two support members spaced apart from one another at a distance, wherein the distance between the at least two support members is sufficient to support the articles in a single stack, said shelving framework comprised of at least two rack sections wherein each rack section accommodates at least one article; and (b) a motorized, conveyor shuttle system having one or more groups of at least two narrow conveyors in each group, each narrow conveyor having a narrow conveyor belt that extends from one rack section to another, and a series of grooved pulleys wherein the grooved pulleys drive the conveyor belt and grab the articles and each narrow conveyor is spaced apart from one another at a distance, wherein the distance between at least two narrow conveyors is sufficient to move in between at least two support members of the constantly stationary shelving framework, wherein:

(i) in retrieving articles from the multi-level rack system, the conveyors are configured to move in between at least two support members of the rack system, in a substantially horizontal direction only, so as to engage the bottom of an article and transfer the article from the at least two support members to the conveyor shuttle system without substantially changing the level of the article; and (ii) in placing articles onto the multi-level rack system, the conveyors are configured to move in between at least two support members of the rack system, in a substantially horizontal direction only, so as to engage the bottom of an article and transfer the article from conveyor shuttle system to the at least two support members without substantially changing the level of the article, such that the conveyors do not contact the at least two support members while transferring articles.

31. A method for placing and retrieving an article stored in a constantly stationary multi-level rack system using a motorized conveyor shuttle system, said multi-level rack system comprising a constantly stationary, substantially horizontal shelving framework of at least two support members spaced apart from one another at a distance, wherein the distance between the at least two support members is sufficient to support the article in a single stack, said shelving framework comprised of at least two rack sections; said motorized conveyor shuttle system having at least two narrow conveyors mounted on a movable member, each narrow conveyor having a narrow conveyor belt that extends from one rack section to another, and a series of grooved pulleys wherein the grooved pulleys drive the conveyor belt and engage the article and each narrow conveyor is spaced apart from one another at a distance, wherein the distance between at least two narrow conveyors is sufficient to move in between at least two support members of the constantly stationary shelving framework so as to engage the article in a substantially horizontal direction only, the movable member comprises a load beam that is positioned adjacent the multi-level rack system such that the movable member moves in a vertical direction, the method comprising the steps of:

(a) placing an article onto the multi-level rack system by moving the conveyors in between at least two support members of the rack system, in a substantially horizontal direction only, so as to transfer an article from the conveyor shuttle system to the rack system while the at least one article is supported by the conveyor shuttle system, (b) activating the conveyor belts to place the article at the same time as the conveyor shuttle system moves in between the at least two support members without substantially changing the level of the article, (c) retrieving an article from the multi-level rack system by moving the conveyors in between the at least two sup port members, in a substantially horizontal direction only, so as to engage the bottom of the article; and (d) activating the conveyor belts to retrieve the article at the same time as the conveyor shuttle system retracts in the horizontal direction away from the rack system without substantially changing the level of the article, wherein the conveyors do not contact the at least two support members while transferring the article.

32. The method of claim 31, further comprising:

moving the conveyors, when the conveyors are not in between the support members, in the vertical direction using the movable member to another, different level of the multi-level rack system from where the article is stored.

* * * * *